US008892358B2

(12) United States Patent
Ren

(10) Patent No.: US 8,892,358 B2
(45) Date of Patent: Nov. 18, 2014

(54) SYSTEM AND METHOD FOR DISTORTION CORRECTION IN THREE-DIMENSIONAL ENVIRONMENT VISUALIZATION

(71) Applicant: Robert Bosch GmbH, Stuttgart (DE)

(72) Inventor: Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/829,016

(22) Filed: Mar. 14, 2013

(65) Prior Publication Data

US 2014/0278065 A1  Sep. 18, 2014

(51) Int. Cl.
*G06T 15/00* (2011.01)

(52) U.S. Cl.
CPC ....................................... *G06T 15/00* (2013.01)
USPC .......................................................... 701/454

(58) Field of Classification Search
USPC .......................................................... 701/454
See application file for complete search history.

(56) References Cited

U.S. PATENT DOCUMENTS

| 2009/0268947 | A1* | 10/2009 | Schaufler | 382/104 |
|---|---|---|---|---|
| 2012/0130561 | A1* | 5/2012 | Chiang | 701/1 |
| 2012/0249794 | A1* | 10/2012 | Kiyo et al. | 348/148 |
| 2013/0194256 | A1* | 8/2013 | Gassmann et al. | 345/419 |

OTHER PUBLICATIONS

Grafe, "Kinematic 3D Laser Scanning for Road or Railway Construction Surveys", 1st International Conference on Machine Control & Guidance; 2008; pp. 1-10; 3D Mapping Solutions GmbH; Germany (10 pages).
Lee et al., "Interactive control of avatars animated with human motion data", ACM Transactions on Graphics (TOG); 2002; pp. 491-500; USA (10 pages).
Li, "Monitoring Around a Vehicle by a Spherical Image Sensor", IEEE Transactions on Intelligent Transportation Systems; 2006; pp. 541-550; vol. 7, No. 4; IEEE; Japan (10 pages).
Li et al., "Easy Calibration of a Blind-Spot-Free Fisheye Camera System Using a Scene of a Parking Space", IEEE Transaction on Intelligent Transportation Systems; 2011; pp. 232-242; vol. 12, No. 1; IEEE; Japan (11 pages).

* cited by examiner

*Primary Examiner* — Mary Cheung
*Assistant Examiner* — Anne Mazzara
(74) *Attorney, Agent, or Firm* — Maginot Moore & Beck LLP

(57) ABSTRACT

A method for graphics in a three-dimensional virtual environment corresponding to a physical environment around a vehicle includes photographs in a plurality of directions extending outward from the vehicle, generating sensor data corresponding to a relative distance from the vehicle and a direction from the vehicle of an object in the physical environment, generating a default three-dimensional projection surface centered around a virtual representation of the vehicle in a virtual environment, deforming the three-dimensional projection surface at relative locations and distances corresponding to the sensor data, projecting the plurality of photographs onto the deformed three-dimensional projection surface, and displaying graphics corresponding to the deformed three-dimensional projection surface with the plurality of projected photographs with a display device.

18 Claims, 11 Drawing Sheets

SYSTEM AND METHOD FOR DISTORTION CORRECTION IN THREE-DIMENSIONAL ENVIRONMENT VISUALIZATION

FIELD

This disclosure relates generally to the field of computer graphics and, more specifically, to systems and methods that display three-dimensional graphics.

BACKGROUND

Many modern software applications display three-dimensional representations of graphical objects and scenes as part of a user interface. Three-dimensional (3D) graphics are used in a wide range of applications including video games, simulations, virtual reality applications, geospatial information applications, and applications for mapping and navigation. In many applications, 3D graphics are more useful than two-dimensional (2D) graphics at depicting real-world environments and locations because the normal interaction between humans and the real-world occurs in three dimensions.

In one form of 3D graphics, different objects in a scene are formed from a large number of polygons. The polygons form shapes and structures in a 3D scene. Since most computing devices only display graphics with a two-dimensional display, the 3D graphics are converted into a rasterized array of two-dimensional pixels for display. The 2D display depicts portions of the three-dimensional scene in a manner similar to a camera taking a two-dimensional photograph of 3D scenes in the real world. Many 3D graphics systems and application programming interfaces (APIs) including the Open Graphics Library (OpenGL) and the Direct 3D APIs provide common structures and interfaces to specialized graphics hardware for generation of 3D images in an efficient manner. The 3D software interacts with general purpose and specialized digital computing hardware that generates the 3D graphics in an efficient manner. In particular, graphical processing units (GPUs) are hardware components that are configured to generate polygons and other graphical effects that form a 3D scene. Modern computing devices typically execute software with a combination of instructions for a central processing unit (CPU) and a GPU to generate the 3D scene and enable interaction with the 3D scene in some software applications. In some hardware embodiments, the functionality of the CPU and GPU are merged together, physically and optionally logically, into a single a system on a chip (SoC) device.

As the computational power and sophistication of digital computing hardware and software have increased, the use of 3D graphics has expanded to a wide range of applications. For example, many motor vehicles include in-vehicle information systems with computer systems that include the hardware and software systems for the display of 3D graphics. Modern motor vehicles often include one or more cameras and video display devices that display video of the environment surrounding the vehicle for assisting the vehicle operator in driving and parking the vehicle. While existing systems typically show video from a single camera with a two-dimensional view of the environment outside the vehicle, a 3D graphics implementation composites multiple photographs from one or more cameras in the vehicle to generate a 3D view of the environment around the vehicle. The 3D graphics view can include animation of the environment around the vehicle as the vehicle moves and as objects in the field of view of the cameras move. One challenge in generating a 3D environment is that the composition of 2D pictures from the cameras often results in an inaccurate rendering of the 3D environment. For example, if the vehicle is parking next to a mailbox on a side of a street, the mailbox is much closer to the vehicle than surrounding buildings or other features in the environment. The depiction of the 3D environment, however, projects both the mailbox and all other features onto a uniform 3D surface, such as a "fishbowl" hemispherical surface. The resulting 3D images include the objects in the photographs, but the 3D scenes do not provide realistic depth perception of objects surrounding the vehicle to the vehicle operator. Consequently, improvements to in-vehicle information systems that enable more realistic 3D representations of physical environments around the vehicle would be beneficial.

SUMMARY

In one embodiment, a method for displaying a virtual environment corresponding to a physical environment around a vehicle has been developed. The method includes generating data corresponding to a plurality of photographs of the physical environment surrounding the vehicle taken in a plurality of directions extending outward from the vehicle, generating sensor data corresponding to a relative distance from the vehicle, and a direction from the vehicle of an object in the physical environment, generating a default three-dimensional projection surface centered around a virtual representation of the vehicle in a virtual environment, deforming the three-dimensional projection surface at a location in the virtual environment corresponding to the object in the sensor data, projecting the plurality of photographs onto the deformed three-dimensional projection surface, and displaying graphics corresponding to the deformed three-dimensional projection surface with the plurality of projected photographs with a display device.

In another embodiment, a system that displays a virtual environment corresponding to a physical environment around a vehicle has been developed. The system includes a camera system configured to generate data corresponding to a plurality of photographs of the physical environment taken in a plurality of directions extending outward from the vehicle, a sensor system configured to generate sensor data corresponding to a relative distance from the vehicle, and direction from the vehicle of an object in the physical environment, a display device, and a processor operatively connected to the camera system, the sensor system, and the display device. The processor is configured to receive the data corresponding to the plurality of photographs generated by the camera system, receive the sensor data corresponding to the shape, relative distance from the vehicle, and direction from the vehicle of the object, generate a default three-dimensional projection surface centered around a virtual representation of the vehicle in a virtual environment, deform the three-dimensional projection surface at relative locations and distances corresponding the sensor data, project the plurality of photographs onto the deformed three-dimensional projection surface, and display graphics corresponding to the deformed three-dimensional projection surface with the plurality of projected photographs with the display device.

DETAILED DESCRIPTION

Figure 1:
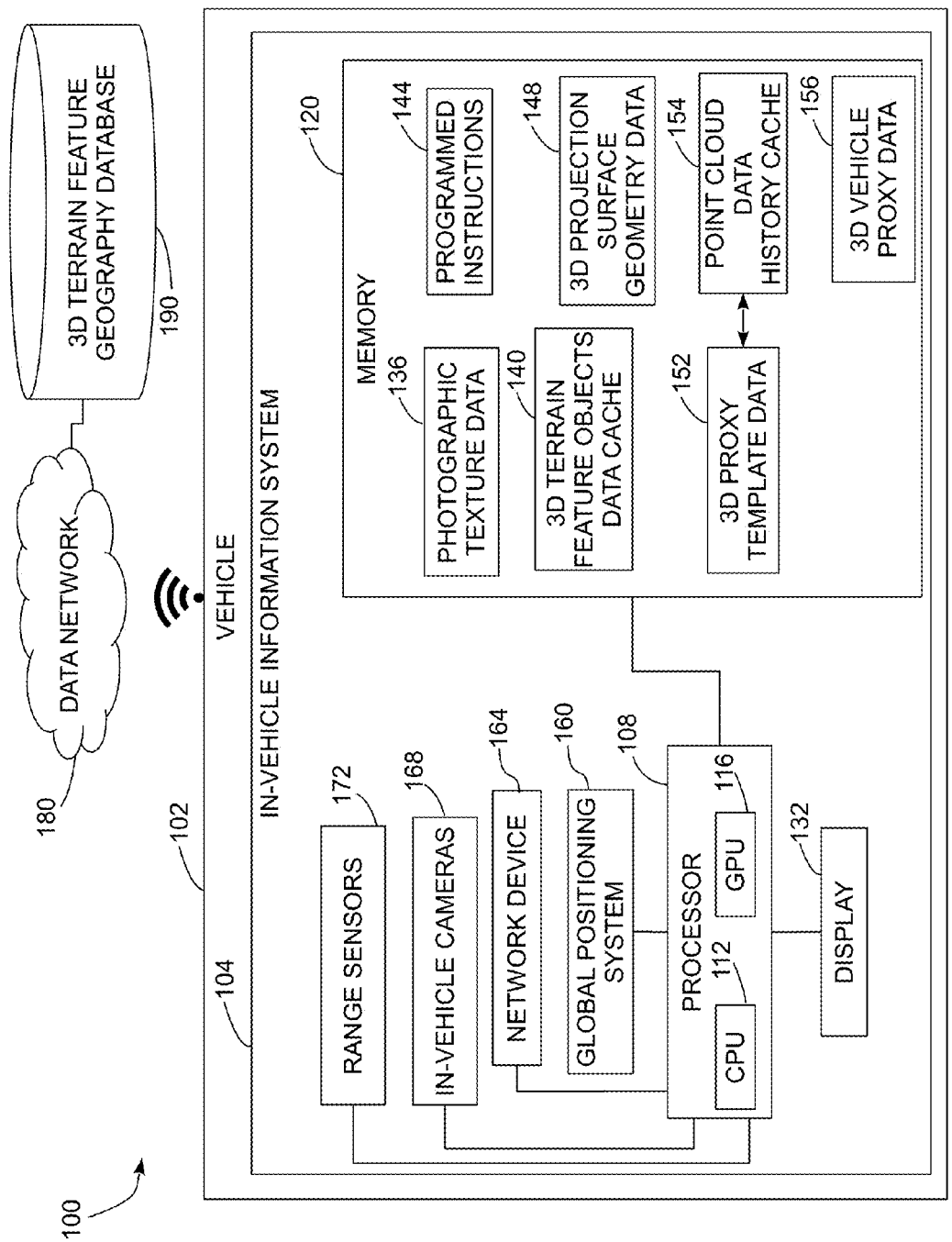
FIG. 1 is a schematic diagram of a system for generating a display of objects in an environment around a vehicle.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As used herein, the term "object" refers to any physical entity that is visible to one or more cameras in a vehicle for display using a display device in the vehicle. Objects include, but are not limited to, terrain features, immobile bodies such as curbs, mailboxes, light posts, and parking meters, and mobile bodies including other vehicles, pedestrians, animals, and the like. As used herein, the term "terrain feature" refers to objects that are typically immobile and remain in place for an extended length of time. Terrain features include natural terrain such as hills, valleys, cliffs, and the like. Terrain features also include normally immobile structures such as roads, parking lots, and buildings. In some embodiments, predetermined map data include three-dimensional models for terrain features. For example, geographic databases store polygon model data corresponding to the sizes, shapes, and locations of terrain features in the physical world for display in mapping programs and other software applications.

As used herein, the term "proxy" refers to predetermined polygon data and optionally color, texture, and lighting data that enable display of graphical depictions of physical objects. For example, a proxy for a vehicle includes 3D model data for a graphical depiction of a physical vehicle that is displayed in a virtual environment to provide information about the location of the vehicle in relation to other objects in the environment around the vehicle to occupants of the vehicle. Other proxies include template polygon data that correspond to approximations of shapes for common objects that occur in the physical world. For example, proxy template models include triangular and quadrilateral prisms, cylinders, pyramids, spheroids, ellipsoids, and other polygon model data that approximate the shapes of objects in the physical world.

As used herein, the term "projection surface" refers to an arrangement of polygons in a 3D virtual environment that form a surface for display of one or more photographs that are generated by cameras in the vehicle. In one embodiment, the projection surface is a continuous mesh formed from polygons that form a curved surface, such as a hemisphere, that extends outward from a location corresponding to the cameras in the vehicle that generate the photographic data. During operation of an in-vehicle information system, a display device depicts all or a portion of the projection surface with photographs taken by the cameras arranged on the polygons of the projection surface. The two-dimensional photograph data are projected into the 3D environment through the texturing process. As described below, an in-vehicle information system deforms the polygons in the projection surface to approximate the shapes of objects that are visible in the photographic data of the environment around the vehicle. The deformation of the 3D projection surface reduces distortion of the objects that are visible in the environment around the vehicle to provide occupants of the vehicle with a more realistic view of the 3D environment around the vehicle.

FIG. 1 depicts a display system 100 that is configured to generate a graphical depiction of objects in an environment around a vehicle. In one configuration, the vehicle display system 100 displays graphical representations of objects and the vehicle to enable the vehicle operator to view the environment around the vehicle in ways that are not practical using the standard windows and mirrors in the vehicle. The system 100 includes an in-vehicle information system 104 that is incorporated in a vehicle 102, optional data network 180, and an optional three-dimensional (3D) terrain feature geography database 190.

In the in-vehicle information system 104, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, global positioning system 160, and network device 164, into a single integrated device. In one embodiment, the CPU is a commercially available central processing device that implements an instruction set such as one of the x86, ARM, Power, or MIPs instruction set families. The GPU 116 includes hardware and software for display of both 2D and 3D graphics. In one embodiment, the CPU 112 and GPU 116 include hardware or software modules for processing photographic image data that are received from the in-vehicle cameras 168. In one embodiment, processor 108 includes software drivers and hardware functionality in the GPU 116 to generate 3D graphics using the OpenGL, OpenGL ES, or Direct3D graphics application programming interfaces (APIs). For example, the GPU 116 includes one or more hardware units including geometry processing units, pixel shader units, vertex shader units, fragment shader units, texture units, and image rasterization units for the generation of a rasterized 2D depiction of a 3D virtual environment. During operation, the CPU 112 and GPU 116 execute stored programmed instructions 144 that are retrieved from the memory 120. In one embodiment, the stored programmed instructions 144 include operating system software and one or more software application programs, including a visualization program that enables occupants of the vehicle 102 to view a 3D representation of objects around the vehicle 102 that are visible to the in-vehicle cameras 168.

The memory 120 includes both non-volatile memory and volatile memory. The non-volatile memory includes solid-state memories such as NAND flash memory, magnetic and optical storage media, or any other suitable data storage device that retains data when the in-vehicle information system 104 is deactivated or loses electrical power. The volatile memory includes static and dynamic random access memory (RAM) that stores software and data, including graphics data and map feature data, during operation of the in-vehicle information system 104. In in-vehicle information system 104, the memory 120 stores photographic texture data 136, a 3D terrain feature objects data cache 140, programmed instructions 144, 3D projection surface geometry data 148, 3D proxy template data 152, a point cloud data history cache 154, and 3D vehicle proxy data 156.

In the memory 120, the photographic texture data 136 include digital data corresponding to a plurality of photographs that the in-vehicle cameras 168 generate corresponding to the environment and objects around the vehicle 102. As described below, the processor 108 generates a mosaic from a plurality of individual photographs and projects the photographic images onto a deformed projection surface to generate a 3D graphical depiction of the environment around the vehicle.

The 3D terrain feature objects data cache 140 stores polygon data corresponding to one or more terrain features in the environment around the vehicle 102. The terrain feature polygon models are stored in association with geographic coordinates for the corresponding terrain features. In one configuration, the 3D terrain feature objects cache 140 stores the polygon data for a plurality of terrain features in a large geographic region for use in multiple applications including mapping, navigation, and visualization applications. In another embodiment, the in-vehicle information system 108 retrieves terrain feature model data from a larger online3D terrain feature geography database 190, and the 3D terrain feature objects data cache 140 stores the polygon model data for a comparatively small region around the vehicle 102. Examples of online terrain feature databases 190 include online mapping and navigation services that present 3D geography and building data to the in-vehicle information system 104 using, for example, an HTML or XML based data format. The processor 108 is configured to use the 3D terrain feature object data models 140 to deform a projection surface for the environment around the vehicle 102 to reflect the terrain features around the vehicle 102 accurately.

The 3D proxy template data 152 include polygon models corresponding to a range of generic shapes for objects that are commonly depicted in the photographic data from the in-vehicle cameras 168. For example, the 3D template model data include polygon models having many basic geometric volume shapes such as rectangular prisms, cylinders, cones, pyramids, spheroids, ellipsoids, and the like. The processor 108 uses the 3D proxy templates data 152 to deform the projection surface using the predetermined 3D proxy template polygon models instead of more complex shapes that are formed using range data generated by the range sensors 172.

In the memory 120, the stored point cloud data cache 154 holds a plurality of point clouds that the range sensors 172 generated during earlier operation of the in-vehicle information system 104. The in-vehicle information system 104 retains cached point cloud data for a predetermined length of time or invalidates the data when the vehicle 102 moves by more than a predetermined distance if the vehicle 102 drives to a new location instead of moving around a small area such as a parking space. In one embodiment, the processor 108 compares the point cloud for the identified object to the point cloud data that are stored in the memory 120, beginning with the stored data for point clouds that were most recently identified. Each set of point cloud data in the point cloud data cache 154 is stored in association with one of the 3D proxy templates 152 in the memory 120. During operation, the processor 108 uses the associated 3D proxy template to deform the projection surface at a location corresponding to the identified point cloud data.

In the memory 120, the 3D vehicle proxy data 156 correspond to a polygon model and other associated graphical data that enable the in-vehicle information system to generate a 3D graphical depiction of the vehicle 102 in a virtual environment. The 3D vehicle proxy data 156 enable the in-vehicle information system 104 to display graphics corresponding to the vehicle 102 in relation to the locations of objects that are visible in the photographic data from the in-vehicle cameras 168.

The in-vehicle information system 104 includes one or more display devices 132. In one embodiment, the display device 132 is a liquid crystal display (LCD), organic light-emitting diode display (OLED) or other suitable display device that generates image output for the vehicle occupants. Displays are commonly mounted in a dashboard or other fixed location in the vehicle. In an alternative embodiment, the display device 132 is a head-up display (HUD) that is projected onto a windshield of a vehicle or projected onto goggles or glasses that are worn by an occupant in the vehicle. In an embodiment where the in-vehicle information system is a handheld mobile electronic device, the display 132 is typically an LCD or organic LED (OLED) flat panel display that is housed in the mobile electronic device.

In the in-vehicle information system 104, the global positioning system (GPS) 160 identifies a location of the vehicle for use in navigation applications. In one embodiment, the GPS 160 includes a radio receiver that receives signals from orbiting navigation satellites. Commercially available satellite GPS receivers are integrated in some in-vehicle information systems, and many mobile electronic devices include satellite GPS receivers as well. In an alternative embodiment, the global positioning system 160 receives signals from terrestrial transmitters including WWAN and WLAN transmitters. The global positioning system 160 identifies a location of the vehicle using triangulation or other geolocation techniques. Some embodiments include receivers for both satellite GPS and terrestrial signals. In some embodiments, the global positioning system 160 further includes an inertial navigation system that assists in identifying the location of the vehicle if signals from the satellite or terrestrial transmitters are unavailable. Additionally, a compass or other orientation finding device that is integrated with the GPS 160 enables the processor 108 to identify the orientation of the vehicle 102, such as whether the vehicle 102 is pointing in a northerly, southerly, eastwardly, or westwardly direction. During operation, the processor 108 receives data from the GPS 160 to identify a geographic location of the vehicle 102. The processor 108 selects a portion of the virtual environment and structures in the virtual environment that correspond to the identified geographic location of the vehicle for display during a navigation operation.

In the embodiment of FIG. 1, the processor 108 sends and receives data using the network device 164. In a vehicle, the network device 164 is often a wireless network device, such as a wireless wide-area network (WWAN) device, which communicates with radio transceivers in a cellular or other wide-area data network while the vehicle is in motion. The network device 164 optionally includes a wireless local area network (WLAN) device for communication with shorter-range wireless local area networks. Examples of WLAN devices include the IEEE 802.11 family of protocols and Bluetooth protocols. In some embodiments, the network device 164 includes a wired network connection, such as Ethernet or USB, for use when the vehicle is parked or for interfacing with another computing device in the compartment of the vehicle. In the in-vehicle information system 104, the processor 108 optionally retrieves 3D terrain feature model data from the online 3D terrain feature geography database 190 through a wireless data network 180.

The cameras 168 include one or more digital camera devices that generate photographic image data of the environment around the vehicle 102. An in-vehicle camera refers to a camera that is placed on the vehicle in a position that provides a view of at least a portion of the environment outside the vehicle. Common configurations of in-vehicle cameras including roof-mounted cameras and cameras that are mounted on other external locations of the vehicle including near the sides and bumpers of the vehicle. The cameras 168 include, but are not limited to, color, monochrome, low-light, and infrared cameras that generate image data of the environment around the vehicle 102 in a wide range of lighting conditions. In one configuration, the cameras are arranged around the vehicle 102 in substantially fixed positions to generate a mosaic of multiple photographs. The processor 108 merges the mosaic photographs to generate panoramic photographic image data of at least a portion of the environment around the vehicle 102, including objects that the vehicle could contact during operation. In another configuration, an in-vehicle camera is operatively connected to one or more actuators that pan, tilt, and optionally translate the camera along a predetermined path to generate the multiple photographic images of the environment around the vehicle 102. Still another configuration includes a combination of fixed cameras and moveable digital cameras to generate the photographic image data of the environment around the vehicle 102. The processor 108 stores the mosaic photographic data in the memory 120 as photographic texture data 136. As described below, the GPU 116 projects the photographic texture data onto a deformed projection surface in a virtual environment to form a visual representation of the environment around the vehicle 102.

The in-vehicle information system 104 is operatively connected to one or more range sensors 172. The range sensors 172 include one or more active and passive range finding devices. Some embodiments of active range finding sensors 172 include, but are not limited to, RADAR, including millimeter-wave RADAR, light detection and ranging (LIDAR), ultrasonic range sensing devices, and the like. As is known in the art, RADAR sensors emit radio waves, with many short-range RADAR systems using radio waves in the millimeter wavelength range. LIDAR sensors emit light beams. The light beams are optionally coherent light beams, which are also referred to as laser light. Ultrasonic sensors emit sound waves at ultrasonic frequencies that are above the hearing range of most humans. Each of the active range-finding sensors described above generates a transmission signal, such as radio waves, laser light beams, or ultrasonic waves, and identifies the range to an object with reference to an amount of time that is taken to receive a corresponding return signal that is reflected from the object when the transmission signal reaches the object. In one configuration of the in-vehicle information system 104, the active range sensors 172 are configured to rotate and pan to "sweep" the environment around the vehicle 102 in the same regions where the cameras 168 generate digital photographic data. In one embodiment, one or more actuators move one or more of the range sensors to sweep the environment. In another embodiment, a phased-array transmitter steers transmission signals from the range finding device electronically without requiring a mechanical actuator. In still another embodiment, a large number of fixed position range sensors arranged around the vehicle 102 generate range data with sufficient resolution to enable the in-vehicle information system 104 to identify the location and approximate shape of objects in the environment around the vehicle 102.

Other embodiments of the range-finding sensors 172 include passive range finding sensors such as stereoscopic cameras, which are also referred to as "depth cameras." In another passive range finding configuration, the range finding cameras 168 are positioned in a non-stereoscopic arrangement, but the processor 108 operates the cameras 168 while the vehicle 102 is in motion. The processor 108 identifies the speed of the vehicle 102 using, for example, a speedometer or the GPS 160 to identify a distance that the vehicle 102 moves between the times when two successive sets of photographic data that are generated by the cameras 168. The processor 108 identifies the range to different objects in the environment around the vehicle 102 using the two sets of photographic data in the same manner as two sets of images that are generated by a stereoscopic camera with a predetermined offset between the lenses in the stereoscopic cameras.

Using either passive or active sensors, the in-vehicle information system 104 typically receives the range data corresponding to objects in the environment around the vehicle 102 as a "point cloud." As used herein, the term "point cloud" refers to a plurality of locations in a 3D space centered around the range finding sensor where a small portion of an object is detected. In one embodiment, the location of each point is identified with a set of 3D coordinate data using, for example, a Cartesian coordinate system with x, y, z coordinates corresponding to a relative width, height, and depth, respectively, of the location from the vehicle 102. In alternative embodiments, the coordinates are stored using spherical coordinates, cylindrical coordinates, or any other 3D coordinate system that is known to the art. For example, using a LIDAR range sensor, a brief transmission from a laser in the LIDAR sensor reflects from a small portion of the surface of an object in the environment around the vehicle 102. The processor 108 identifies a relative orientation of the LIDAR range sensor 172 during the transmission of the laser light, and identifies a relative direction and distance of the portion of the object from the LIDAR range sensor 172 with reference to the orientation of the sensor, predetermined location of the sensor on the vehicle 102, and identified range to the object. The processor 108 converts the identified range and orientation data to 3D coordinates in a virtual environment around the vehicle 102. In an embodiment where the range sensors 172 include passive range finding cameras, the processor 108 identifies corresponding pixel locations in the photographic image data from multiple images and identifies the range to a small portion of the object using, for example, triangulation between the first and second images. The processor 108 identifies multiple corresponding pixels between the multiple sets of image data to form the point cloud coordinates using passive range sensors.

The in-vehicle information system 104 generates a large number of points in various locations throughout the environment around the vehicle 102 to identify the distance and approximate shape of objects in the environment around the vehicle 102. In some instances, objects that are visible to the cameras 168 are located beyond an effective range of the range-finding sensors 172. For example, the cameras 168 may photograph a distant hill that is beyond the effective detection range of the range-finding sensors 172. As described below, objects that are beyond the range of the range-finding sensors 172 are either projected onto a default 3D polygon surface object that represents the environment around the vehicle 102 or additional terrain feature data can be used to distort the default 3D surface object to conform to the shape of the distant terrain features.

Figure 2:
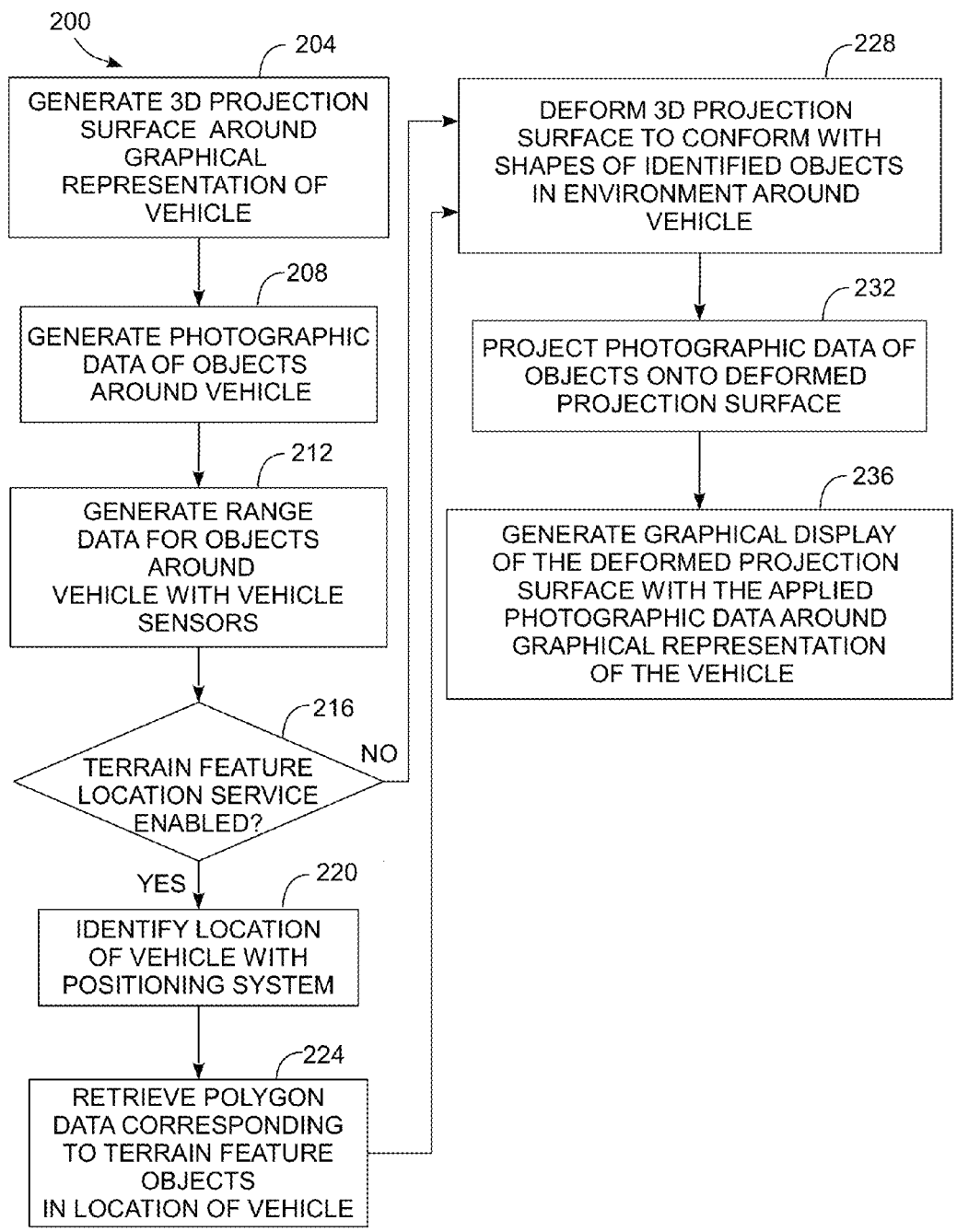
FIG. 2 is a block diagram of a process for display of images depicting an environment around a vehicle that includes generation of a geometric model corresponding to objects and terrain features in the environment around the vehicle.

FIG. 2 depicts a process 200 for generation of a graphical display of objects in a physical environment around a vehicle using photographic data generated by cameras in the vehicle and geometric data that approximate the objects in the physical environment around the vehicle. In the description below, a reference to the process 200 performing or doing some function or action refers to one or more controllers or processors that are configured with programmed instructions, which are executed by the controllers or processors to implement the process performing the function or action or operating one or more components to perform the function or action. The process 200 is described with reference to the display system 100 of FIG. 1.

Figure 5:
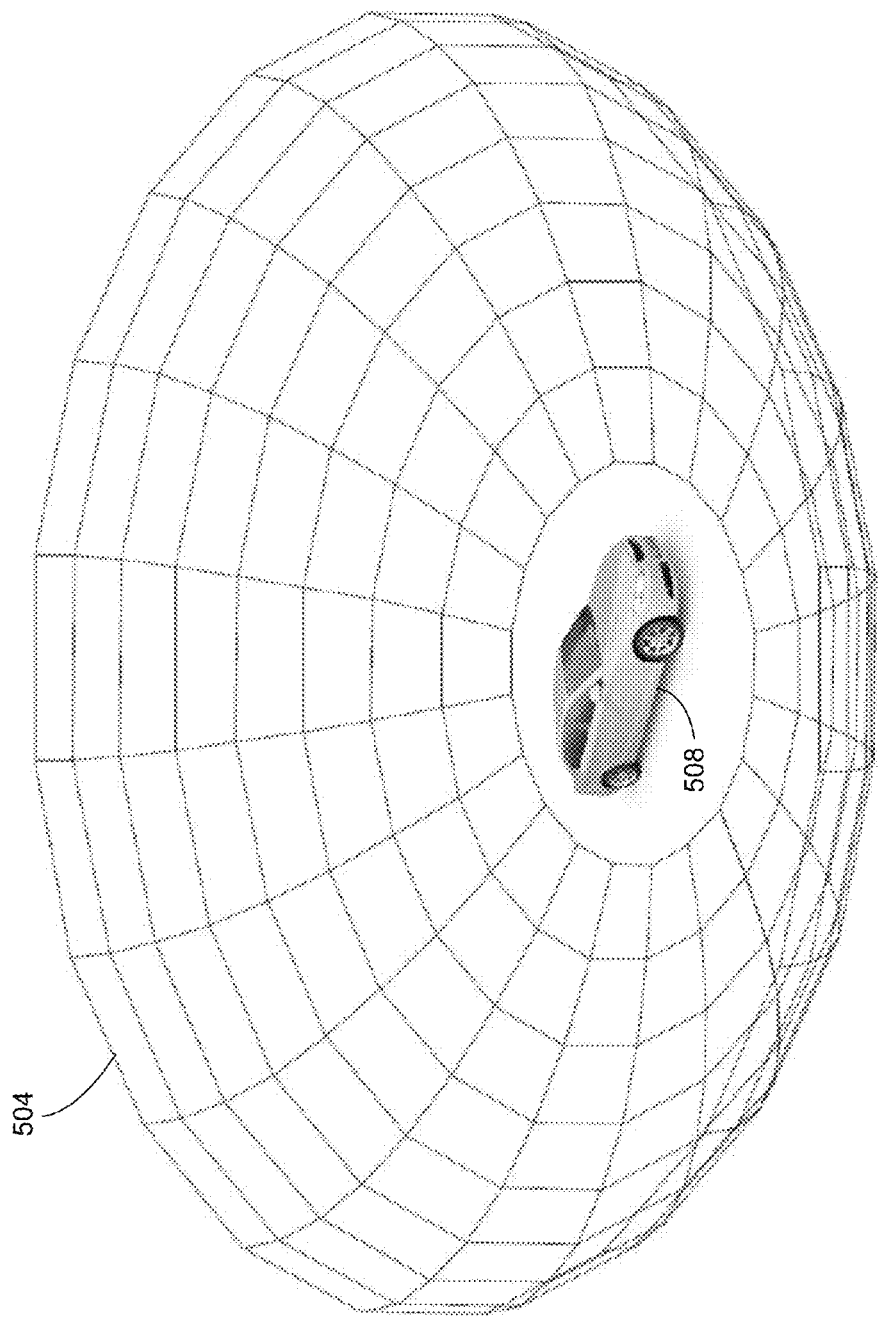
FIG. 5 is a depiction of a 3D proxy model of a vehicle and a default projection surface.

In the illustrative embodiment of FIG. 2, process 200 begins with generation of a 3D projection surface around a graphical representation of the vehicle 102 (block 204). In the in-vehicle information system 104, the memory 120 stores 3D projection surface geometry data 148 corresponding to a default projection surface that is generated around a 3D proxy model of the vehicle 102. In one embodiment, the 3D projection surface is an inverted hemisphere with the apex of the inverted hemisphere representing a location of the vehicle. In other embodiments, the default projection surface is generated as a sphere, semi-ellipsoid, rectangular prism, cylinder, or other projection surface that is suitable for use in displaying photographic images generated by the in-vehicle cameras 168. The memory 120 also stores the 3D vehicle proxy data, which include geometry, color, texture, and lighting data to enable the GPU 116 to generate a graphical depiction of the vehicle 102 in the 3D virtual environment. FIG. 5 depicts an illustrative view of a hemispherical projection surface 504 and a vehicle proxy model 508.

Process 200 continues as the in-vehicle information system 104 generates photographic data of the environment around the vehicle 102, including both mobile and immobile objects and terrain feature objects, using the in-vehicle cameras 168 (block 208). The photographic data typically include either multiple photographs that are generated by multiple cameras that are arranged around the vehicle 102, or multiple photographs from a single camera that is operatively connected to one or more actuators to generate photographs in different directions from the vehicle 102.

As described above, the processor 108 is configured to merge multiple photographs to form a mosaic of photographic data for a continuous view of at least a portion of the environment around the vehicle 102. For example, in one embodiment the cameras 168 are located in predetermined positions around the vehicle 102 with some degree of overlap between the fields of view for neighboring cameras. Each camera generates photographic image data including a rectangular array of pixels. The processor 108 identifies predetermined pixel coordinates in two photographic images in the region of overlap between the digital cameras that generated the respective photographic images and combines the non-overlapping portions of the two photographic images into a larger photographic image. The processor 108 continues merging photographic image data for multiple photographs to form a panoramic image. In embodiments where a single camera generates multiple images, the processor 108 operates the camera actuators to move the camera to predetermined positions with overlap between the field of view for the camera between successive positions, and generates the mosaic image for the overlapping images in a similar manner. In some vehicle embodiments, the mosaic image corresponds to a 360° region around the front, back, and sides of the vehicle 102 including a vertical field of view that includes bumpers and other portions of the vehicle 102 that may come onto contact with external objects as the vehicle 102 moves. In another embodiment, the cameras 168 include fields of view covering only a portion of the environment around the vehicle 102, such as a 180° region behind the vehicle 102, and the mosaic image corresponds to the limited region in the fields of view of the cameras.

Figure 6:
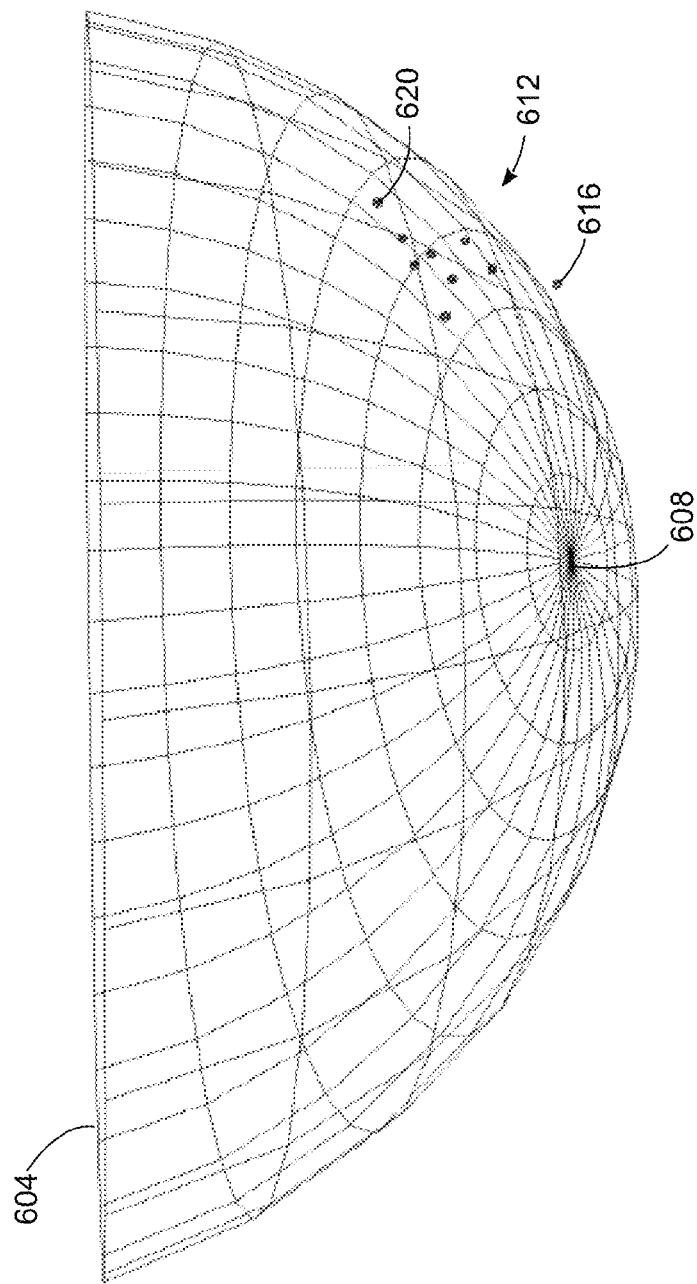
FIG. 6 is a depiction of a projection surface and a point cloud that is generated using range sensors in a vehicle and corresponds to an object in an environment around the vehicle.

During process 200, the in-vehicle information system 104 generates range data corresponding to objects around the vehicle 102 before, during, or after the generation of the photographic data of the objects around the vehicle 102 (block 212). In the in-vehicle information system 104, the depth sensors 172 generate range data for multiple objects that are within the fields of view of the cameras 168. As described above, the processor 108 generates a point cloud corresponding to objects in the environment around the vehicle with reference to the data received from the sensors. FIG. 6 depicts an illustrative point cloud in a virtual environment around the vehicle 102. In FIG. 6, the virtual environment includes a 3D projection surface 604, which is formed in the inverted hemispherical shape with an apex 608 of the inverted hemisphere projection surface 604 corresponding to a location of the vehicle 102 (omitted for clarity). In FIG. 6, the processor 108 identifies a point cloud 612 including a plurality of points, such as points 620 and 616, which correspond to portions of an object in the physical environment around the vehicle 102. As depicted in FIG. 6, the data point 620 in the point cloud 612 is located within the inverted hemisphere polygon mesh of the projection surface 604, while the data point 616 is located outside the inverted hemisphere polygon mesh of the projection surface 604. The points in the point cloud 612 form an approximation of the size and shape of an object in the physical environment around the vehicle 102 as detected by the depth sensors. As described in more detail below, during process 200 the processor 108 deforms the shape of the projection surface 604 to enable the generation of a 3D graphical depiction of the object corresponding to the point cloud 612 with reduced distortion to the shape of the object.

Referring again to the process 200 of FIG. 2 the in-vehicle information system 104 optionally identifies objects only with reference to the data from the range sensors 172 without using a location service to identify terrain feature objects around the vehicle 102 (block 216), and the process 200 continues with the processing described below with reference to block 228. In another configuration, the in-vehicle information system is configured to receive additional data corresponding to terrain features that are stored in a terrain feature database and are accessed with reference to an identified geographical location of the vehicle 102 (block 216). In the in-vehicle information system 104, the GPS device 160 receives signals from multiple external transmitters, including satellite transmitters, terrestrial transmitters, or both, to identify geographical coordinates for the vehicle 102 (block 220). The processor 108 retrieves polygon geometry data that correspond to one or more terrain feature objects in the environment around the vehicle 102 in a terrain feature database.

During process 200, the processor 108 uses the identified geographic coordinates from the GPS 160 to retrieve the polygon data for terrain features that are near the vehicle 102 (block 224). In one embodiment of the in-vehicle information system 104, the processor 108 retrieves the geometry data for the identified terrain features from the 3D terrain features objects data cache 140. Some in-vehicle information system embodiments include mapping software applications that store 3D terrain feature data in the memory 120 for use in displaying maps and providing navigation information. In another embodiment of the in-vehicle information system 104, the online geography database 190 stores 3D terrain feature model data and the processor 108 generates a query for the database 190 using the geographic coordinates for the vehicle 102 that are received from the GPS 160. The 3D terrain feature geography database 190 retrieves 3D model data for terrain feature objects around the location of the vehicle 102, and the in-vehicle information system 104 receives the 3D terrain feature object data through the data network 180 using the network device 164. The processor 108 optionally stores the 3D terrain feature data from the database 190 in the 3D terrain features cache 140 for temporary use while the vehicle 102 remains within a geographic region that includes the identified terrain feature objects and corresponding terrain feature object data.

Figure 8:
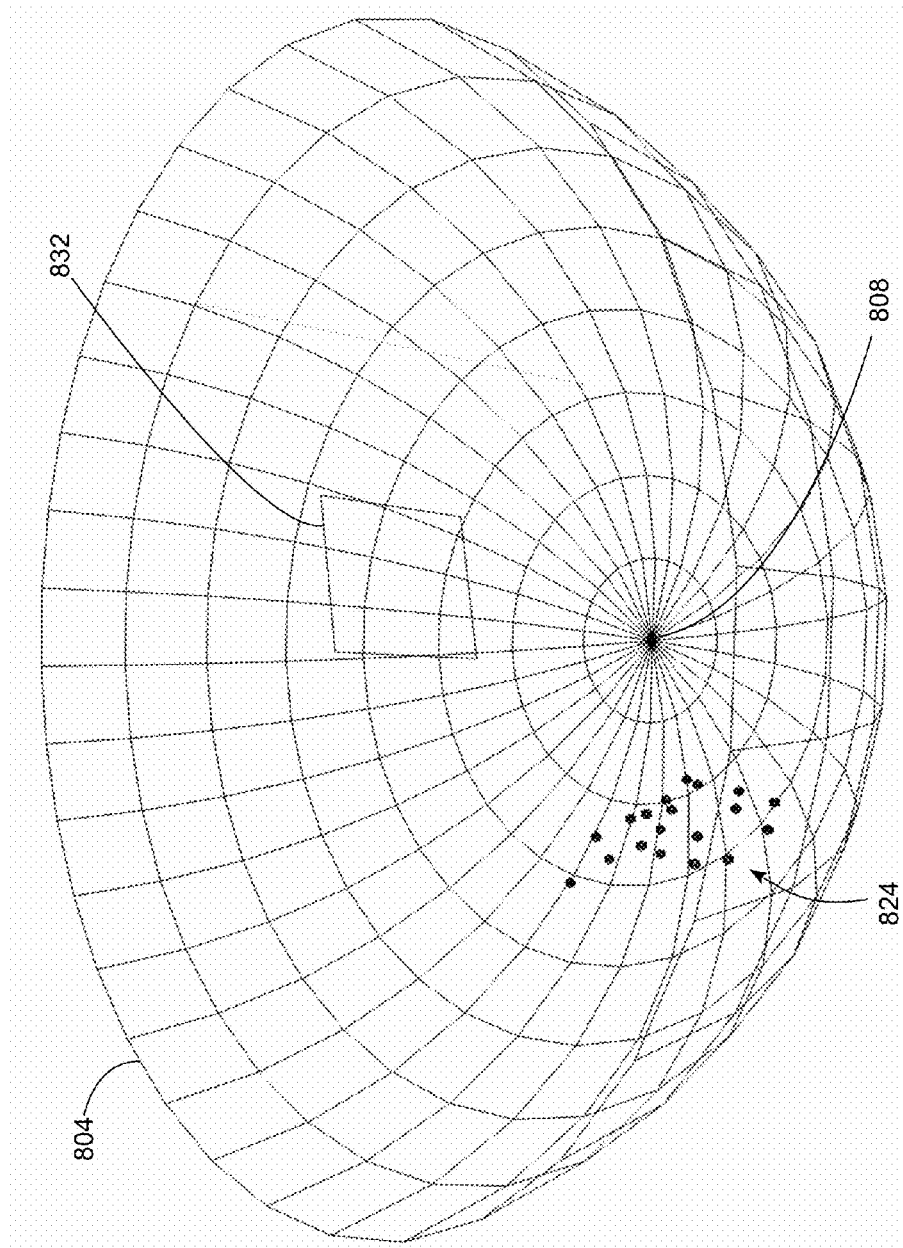
FIG. 8 is a depiction of another projection surface, a point cloud that is generated using range sensors in a vehicle, and a polygon model corresponding to a terrain feature object in the environment around the vehicle that is retrieved from a database.

FIG. 8 depicts a virtual environment including a projection surface 804, point cloud 824, and a polygon corresponding to a terrain feature object that is retrieved during process 200. The processor 108 identifies a geographic location of the vehicle 102 at the apex 808 of the inverted hemispherical projection surface 804, and the process 108 inserts the polygon 832 corresponding to the terrain feature into the virtual environment corresponding to a relative geographic location of the terrain feature object to the vehicle 102. If the terrain feature is within the effective range of the range sensors 172, then the processor 108 optionally aligns the polygons for the terrain feature object to a corresponding point cloud of data from the range detection sensors to increase the accuracy of the placement of the polygons for the terrain feature object within the virtual environment. In the illustrative embodiment of FIG. 8, the polygon 832 is a rectangle that corresponds to, for example, a wall of a building that is near the location of the vehicle 102. In some embodiments, the processor 108 omits polygons in the terrain feature data that are not visible to the cameras and other sensors in the in-vehicle information system 104. For example, the polygon 832 can be part of a larger polygon model representing a building, but additional polygons that correspond to sections of the building that are not visible to the in-vehicle cameras 168 are omitted.

Figure 9:
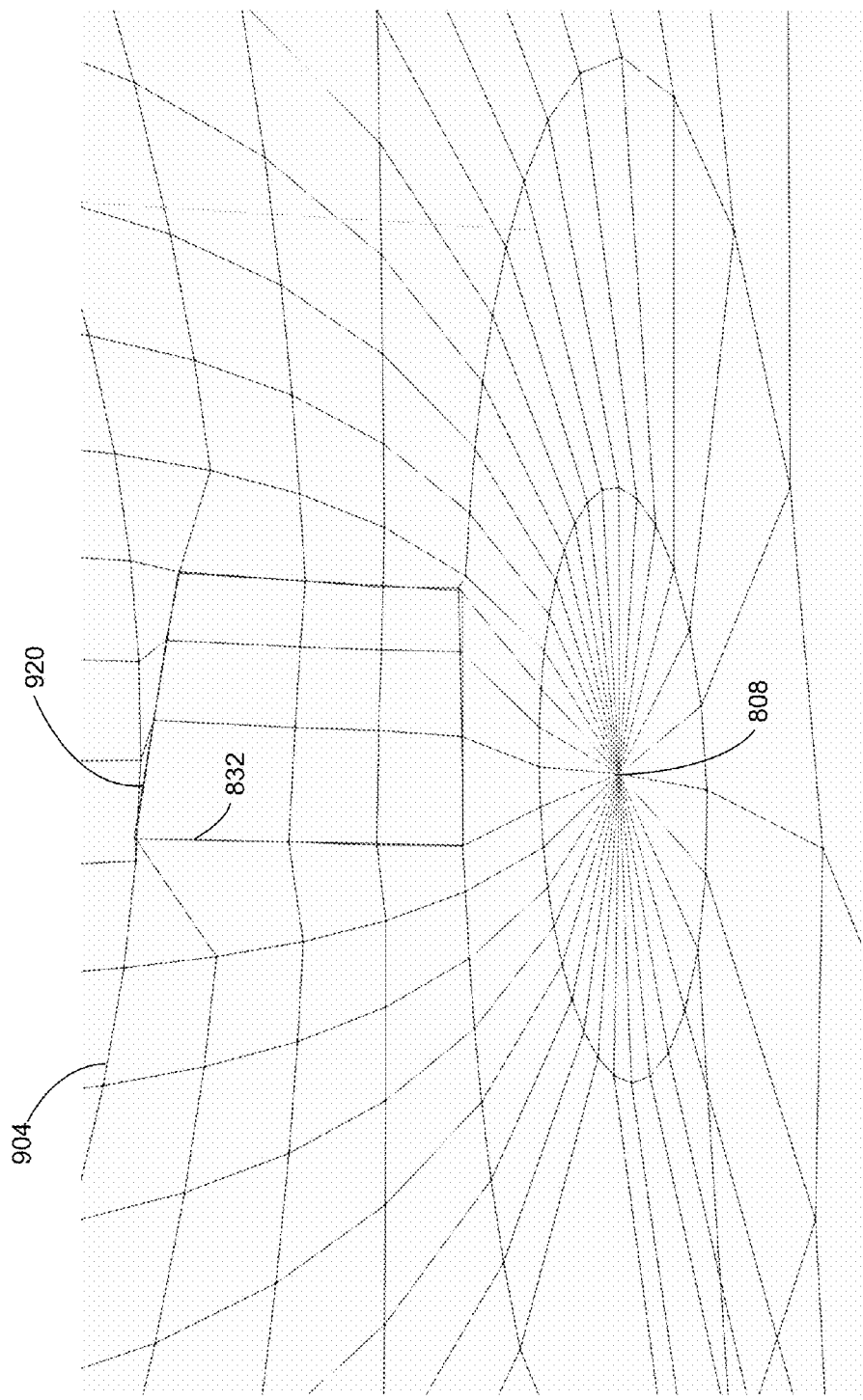
FIG. 9 is a depiction of a projection surface that is deformed to correspond to the polygon model of the terrain feature object in FIG. 8.

Referring again to FIG. 2, process 200 continues with deformation of the projection surface to conform to objects in the environment around the vehicle 102 (block 228). The data corresponding to objects include point clouds that are identified for objects using the ranging sensors 172 and optionally geometry data for the terrain features that are located in the environment around the vehicle 102. In an embodiment where the in-vehicle information system 104 retrieves terrain feature model data corresponding to terrain feature objects around the vehicle 102, the processor 108 deforms the projection surface to conform to the polygon models of the terrain features. For example, FIG. 8 depicts a projection surface 804 that extends from a location 808 of a vehicle proxy model in a 3D virtual environment. The polygon 832 corresponds to a terrain feature in the physical environment around the building. The processor 108 translates vertices in the polygons of the projection surface onto the surface of the polygon 832 to deform the projection surface 804. FIG. 9 depicts the deformed projection surface 904 with a portion of the vertices 920 in the polygons that form the projection surface translated to conform to the surface of the terrain feature model polygon 832.

In addition to deforming the projection surface to conform to the terrain feature models, the processor 108 deforms the projection surface to approximate the surface shapes of objects in the environment around the vehicle 102 that the in-vehicle information system 104 identifies from the point cloud data received from the range sensors 172. During process 200, different configurations of the in-vehicle information system 104 perform two different processes to deform the projection surface from the default shape to a shape that approximates the surfaces of the identified objects in the environment around the vehicle 102. One process deforms the projection surface using an optimization method based on the point cloud data. Another process identifies a predetermined 3D proxy template model corresponding to the point cloud data and deforms the projection surface to conform to the 3D proxy template model. The optimization and template deformation processes are described below with reference to FIG. 3 and FIG. 4, respectively.

Figure 3:
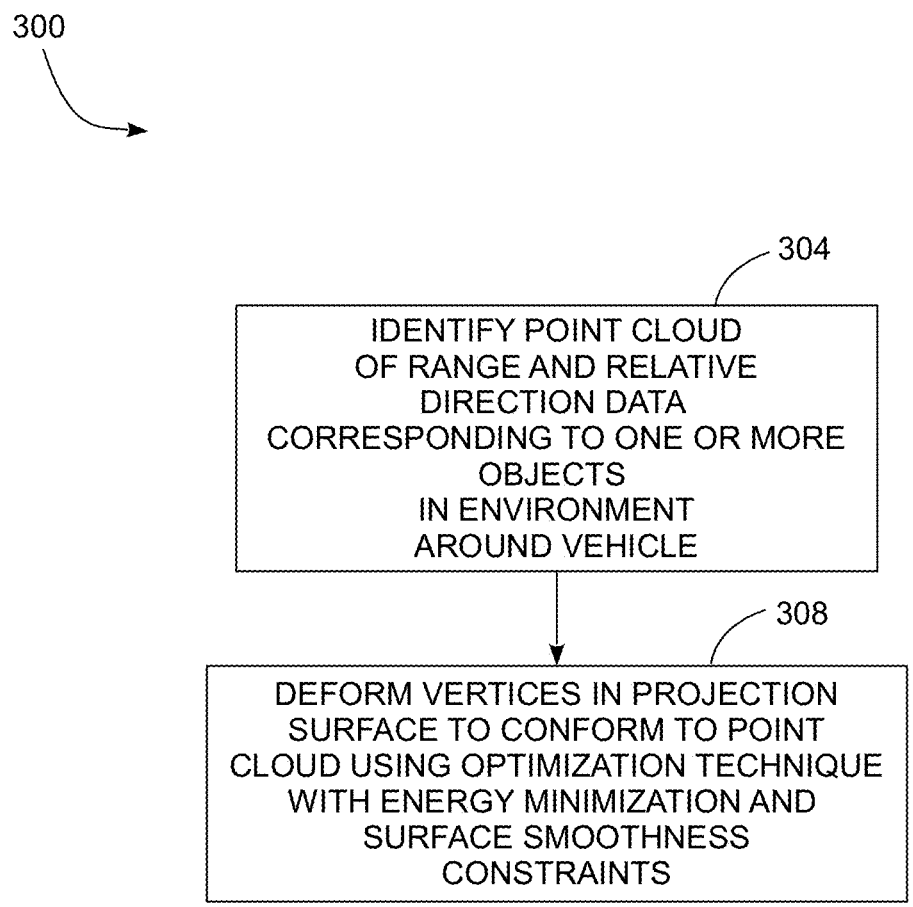
FIG. 3 is a block diagram of process for deforming a projection surface to approximate a shape of an object.

FIG. 3 depicts an optimization process 300 for deformation of the 3D projection surface to approximate the shape of objects around the vehicle 102 using the point cloud data that are received from the range finding sensors in the vehicle 102. In the description below, a reference to the process 300 performing or doing some function or action refers to one or more controllers or processors that are configured with programmed instructions, which are executed by the controllers or processors to implement the process performing the function or action or operating one or more components to perform the function or action. The process 300 is described with reference to the display system 100 of FIG. 1 and the process 200 of FIG. 2.

During process 300, the in-vehicle information system 104 identifies a group of points in a point cloud that correspond to an object in the environment around the vehicle 102 (block 304). In one embodiment, the point cloud includes all range points that are generated in the environment around the vehicle. The point cloud data may correspond to one or more objects that are proximate to the vehicle, and the in-vehicle information system 104 deforms one or more regions of the projection surface with reference to the entire point cloud. In another embodiment, the processor 108 identifies groups of points in the point cloud data that correspond to an individual object using, for example, a K-means clustering algorithm or another clustering algorithm, edge detection algorithms, and other classification algorithms that are known to the art.

The identified points in the point cloud that correspond to the object approximate the shapes and sizes of the object as viewed from the vehicle 102, but the individual locations in the point cloud are not always reliable indicators of the overall shape of the object. For example, the ranging sensors 172 are susceptible to returning incorrect range data for some points in the data point cloud due to noise in the environment around the vehicle 102 or to noise in the ranging sensors hardware. For example, dust or other contaminants in the atmosphere around the vehicle 102 can generate false range results for some data points in the point cloud. Additionally, the individual range data points that are generated by the range sensors 172 are often of insufficient resolution to generate a highly accurate shape corresponding to the surface of the identified object.

During process 300, the processor 108 applies a minimal-energy optimization process with a smoothness constraint to deform vertices in the projection surface into a surface shape that approximates the surface of the object in the identified point cloud data (block 308). As described above, the point cloud data are typically of insufficient accuracy and resolution to deform the projection surface to the individual point cloud coordinates. Instead, the processor 108 applies a minimum energy optimization process to deform some of the vertices in the polygons of the projection surface to form a deformed surface that approximates the shape of the point cloud coordinates while also maintaining a predetermined degree of smoothness. The minimum energy optimization process attempts to minimize the distance between the surface and the points in the point cloud, where the distance between the projection surface and the points is modeled as energy and the optimization function attempts to minimize the energy. The optimization function also uses the predetermined smoothness factor as a constraint on the optimization process to prevent deformation of the projection surface into a jagged surface with discontinuities that are generated if the processor 108 simply deforms the projection surface to intersect the coordinates of each point in the point cloud. During process 200, the processor 108 performs the process 300 to deform the projection surface for one or more objects that are identified in the environment around the vehicle 102.

Figure 7:
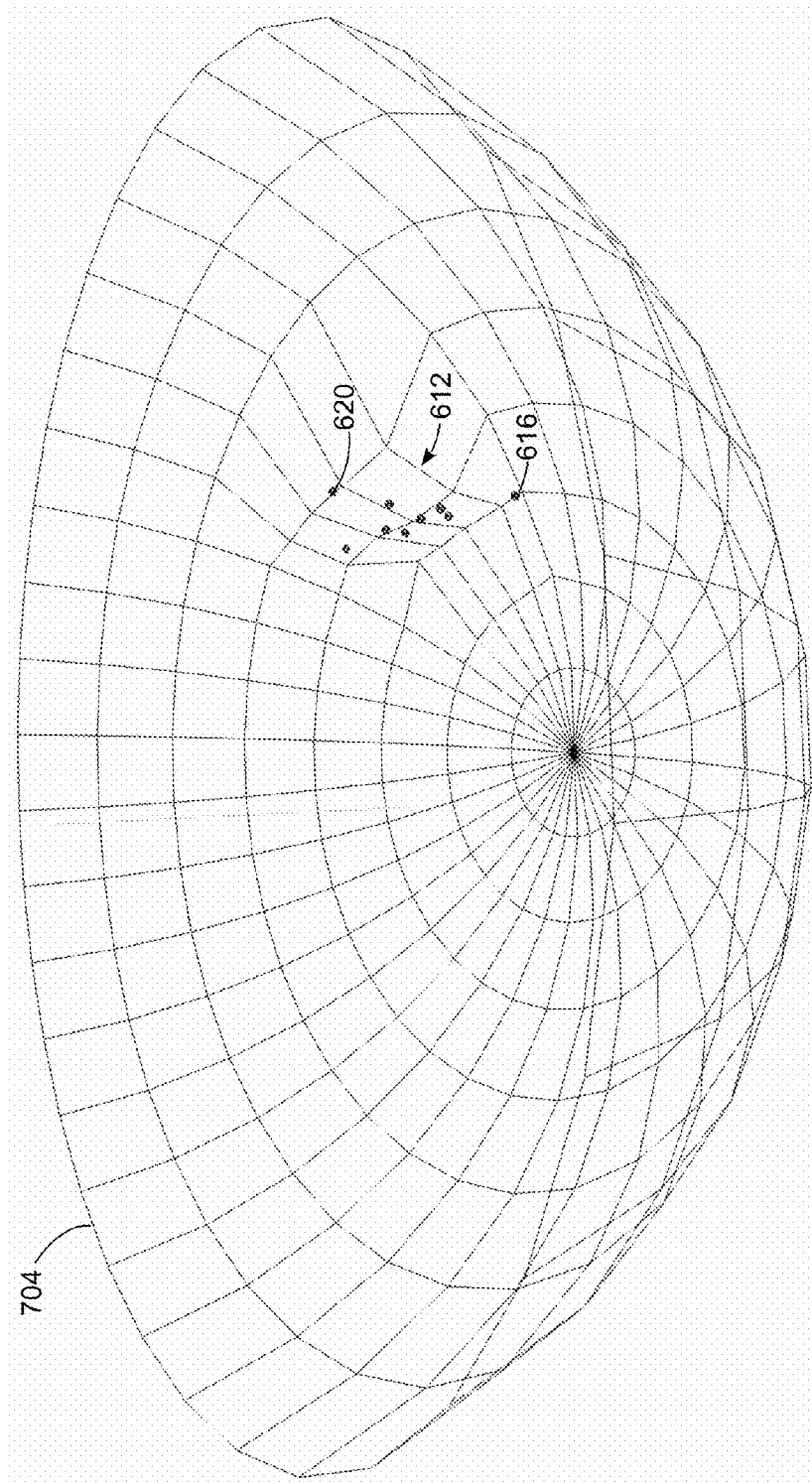
FIG. 7 is a depiction of a projection surface that is deformed to correspond to the point cloud depicted in FIG. 6.

Referring to FIG. 6 and FIG. 7, the point cloud 612 is displayed with the projection surface 604 in FIG. 6 prior to the deformation process 300. FIG. 7 depicts another view of the point cloud 612 after the processor 108 deforms the projection surface 604 to form the projection surface 704. The projection surface 704 is deformed to correspond to the approximate shape of the coordinates formed by the points in the point cloud 612, but the processor 108 maintains a minimum surface smoothness for the deformed projection surface 704 during the minimum energy optimization process. In the example of FIG. 7, the processor 108 deforms the projection surface 704 by translating the locations of selected vertices in the polygon mesh that forms the projection surface 604. In another embodiment of the process 300, the processor 108 generates additional polygons or removes additional polygons in the polygon mesh that forms the projection surface during the optimization process. In some embodiments, the processor 108 also generates curves such as Bezier and B-spline curves in the projection surface to maintain the smoothness of the deformed projection surface.

The smoothness constraint in the minimum energy operation also refers to smoothness of a surface deformation over time during operation of the in-vehicle information system 104. For example, in one embodiment the range sensors 172 generate point clouds of range data several times every second, and the cameras 168 generate photographic data several times a second for video display of the environment around the vehicle 102. The processor 108 performs the optimization process for deforming the projection surface to the point cloud data using the deformed projection surface that was generated from an earlier set of point cloud data to reduce the effects of random noise in the point cloud data and provide a stable display of objects in the environment around the vehicle. For example, if the vehicle 102 is stationary or moving at a low rate of speed, then the projection surface corresponding to objects around the vehicle 102 does not change by a large amount over a short length of time. The processor 108 constrains the deformation of the projection surface to limit the changes that are made to the previously generated deformation surface to reduce the effects of transient noise in the point cloud data during the optimization process.

Figure 4:
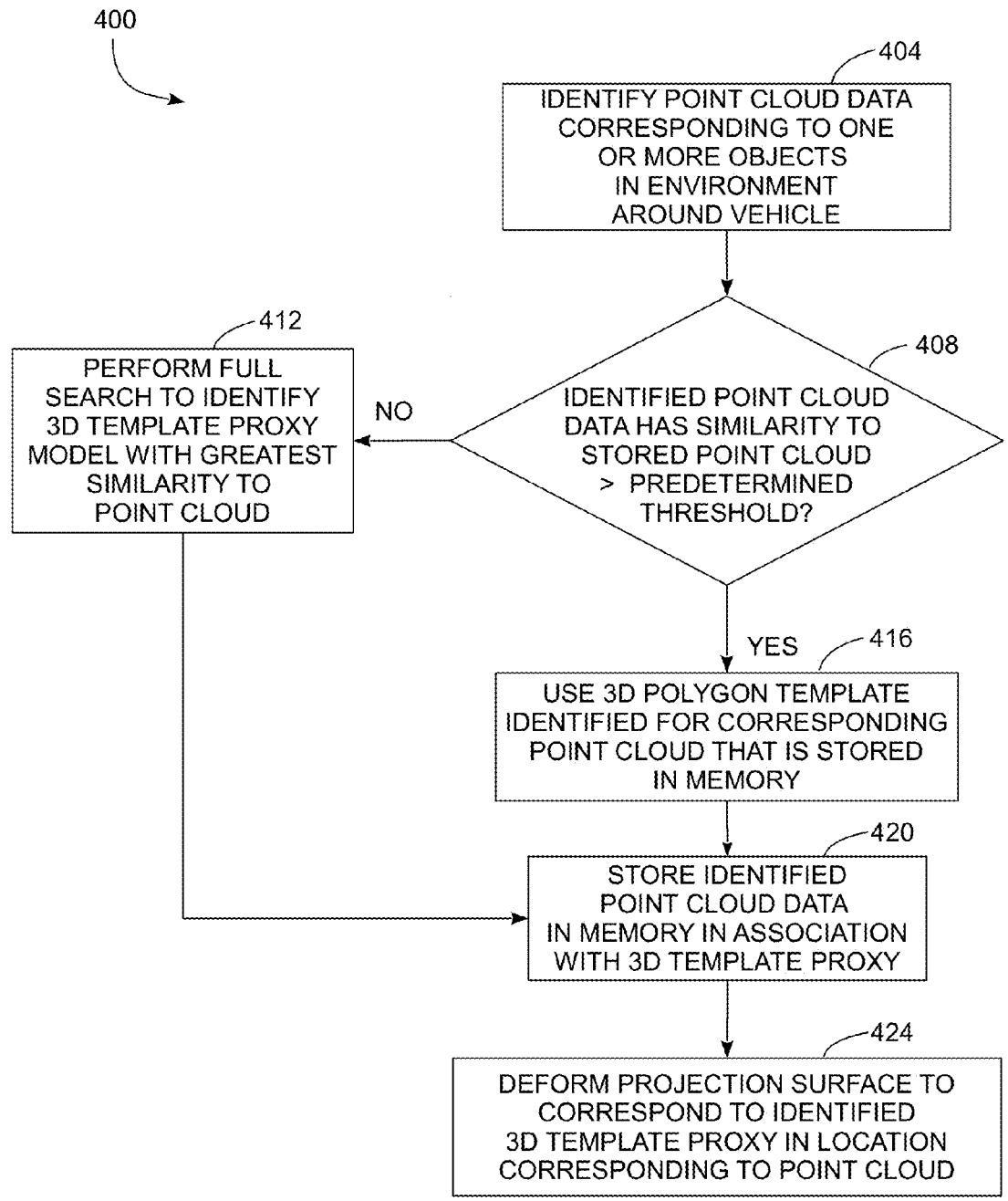
FIG. 4 is a block diagram of a process for deforming a projection surface to conform to a 3D template model that corresponds to a shape of an object.

FIG. 4 depicts a process 400 for identifying a predetermined three-dimensional polygon template object that approximates the shape of three-dimensional point cloud data that are received from the range sensors. In the description below, a reference to the process 400 performing or doing some function or action refers to one or more controllers or processors that are configured with programmed instructions, which are executed by the controllers or processors to implement the process performing the function or action or operating one or more components to perform the function or action. The process 400 is described with reference to the display system 100 of FIG. 1 and the process 200 of FIG. 2.

During process 400, the in-vehicle information system 104 identifies a group of points in a point cloud that correspond to an object in the environment around the vehicle 102 (block 404). The in-vehicle information system identifies the object in the virtual environment in process 400 in the same manner as the processing described above with reference to block 304 of the process 300. Process 400 continues by determining whether the identified point cloud data for the object have a sufficiently high similarity to stored point cloud data in the point cloud data history cache 154 (block 408). In one embodiment, the processor 108 searches the stored point cloud data 154 beginning with the point cloud data that were most recently generated by the range sensors 172 and stored in the memory 120 to identify similar objects using temporal locality. In another embodiment, the processor 108 extracts one or more features from the 3D point cloud data and generates hashes corresponding to the extracted features. The processor stores the hashes in the point cloud history cache 154 in association with the corresponding 3D proxy template data 152. The extracted features are more stable than individual point clouds, and the processor 108 extracts the same features from subsequently generated point cloud data from the range sensors 172. The processor 108 then identifies the same hash value for the extracted features and retrieves the corresponding proxy template data for the point cloud data.

If the processor 108 does not identify a stored point cloud data that exceeds the predetermined similarity threshold (block 408), then the processor 108 performs a full search through the stored 3D proxy template data to identify one of the 3D proxy templates having the greatest similarity to the identified point cloud data (block 412). The full search process includes a comparison between the point cloud and the polygon model data corresponding to the polygon data for the 3D proxy template models 152 that are stored in the memory 120. In one embodiment, the processor 108 scales the sizes either or both of the point cloud data and the 3D proxy template model data to normalize the size between the point cloud data and the 3D proxy template model. The processor 108 subsequently identifies a best-fit process to identify an error between the locations of the data points in the point cloud and the surface of the 3D proxy template without modifying the relative locations of the data points in the point cloud. In a "greedy search" configuration for the full search, the processor 108 identifies one of the 3D proxy template models having the minimum error in comparison to the point cloud data after comparing each of the 3D proxy templates to the point cloud data. In a non-greedy search configuration, the processor 108 identifies the first 3D proxy template model with an error that is below a predetermined error threshold in response to the comparison with the point cloud data.

If the processor 108 identifies point cloud data in the point cloud data cache 154 with a degree of similarity that exceeds the predetermined threshold (block 408), then the processor 108 identifies the 3D proxy template that is already associated with the identified point cloud data in the memory (block 416). In the in-vehicle information system 104, the memory 120 stores the point cloud data history cache 154 in association with the predetermined 3D proxy template data 152. The processor 108 performs a lookup using the stored association to identify the 3D proxy template.

Process 400 continues as the processor 108 updates the point cloud history cache with the point cloud data for the identified object, and the association between the point cloud data and the identified 3D proxy template data 152 (block 420). The processor 108 stores the newly identified point cloud data and 3D proxy template association in the memory 120 to enable more efficient identification of similar point clouds during continuing operation of the in-vehicle information system 108. In one embodiment, if the processor 108 identifies that the newly identified point cloud data correspond to existing point cloud data that are stored in the point cloud data history cache 154, then the processor 108 replaces the previously stored point cloud data with the newly generated point cloud data.

Figure 10:
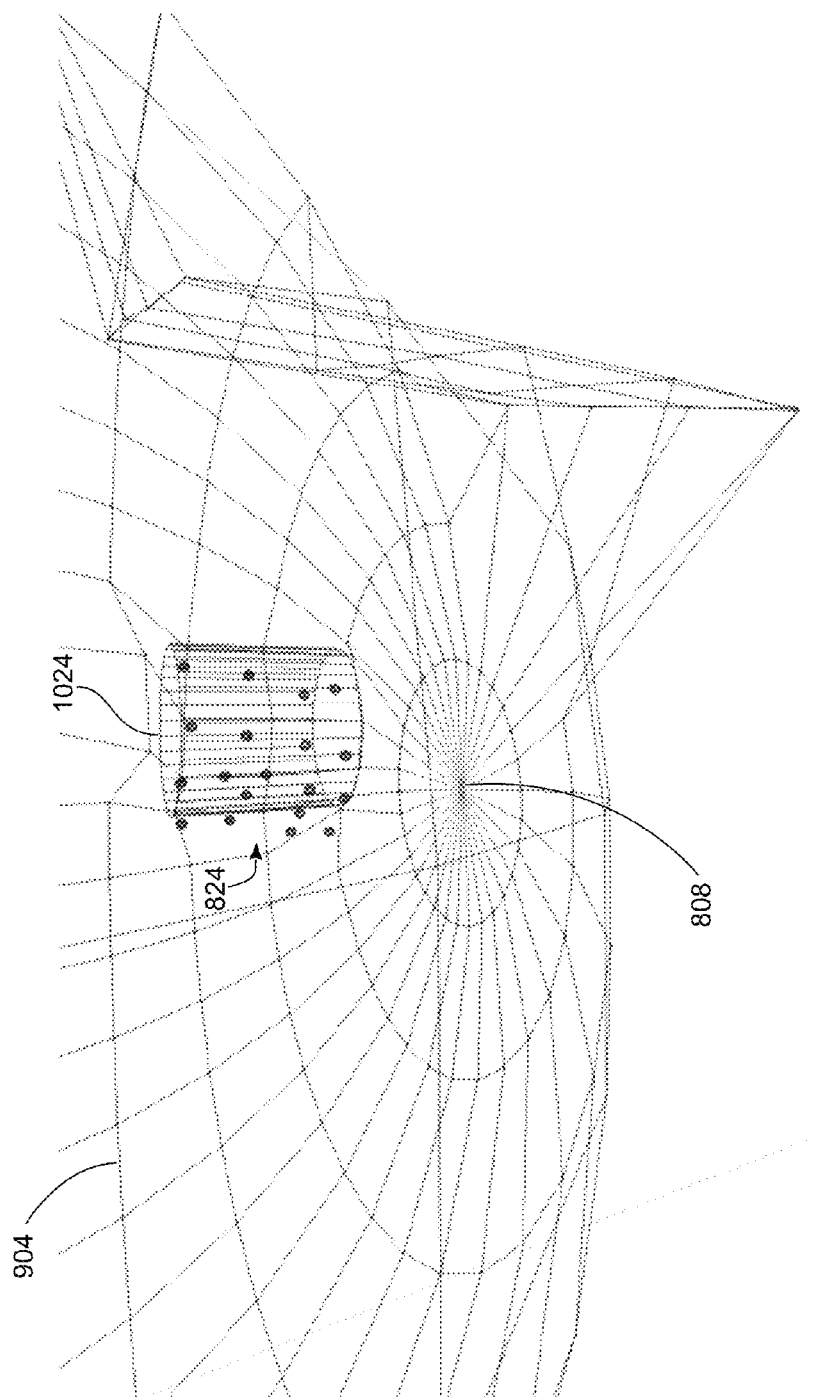
FIG. 10 is a depiction of a projection surface that is deformed to correspond to a surface of a 3D proxy model that corresponds to the shape of the point cloud depicted in FIG. 8.

Process 400 continues with deformation of the projection surface to correspond to the identified 3D proxy template for the generated point cloud data (block 424). During the deformation process, the processor 108 positions the 3D proxy template object at a location and with an orientation that corresponds to the point cloud data in the virtual environment around the vehicle 102. Because the 3D proxy template model is a regular polygon, the processor 108 translates one or more vertices in the polygons that form the projection surface onto the surface of the 3D proxy template to deform the projection surface. For example, as depicted in FIG. 8 and FIG. 10, the point cloud 824 in the virtual environment around the vehicle 102 location 808 has a form that corresponds to a cylinder 3D proxy template model 1024. The processor 108 translates selected vertices on the projection surface 804 of FIG. 8 to the surface of the cylinder 1024 to deform the projection surface 804 into the deformed projection surface 904 including a shape that corresponds to the identified 3D proxy cylinder 1024 for the point cloud data 824.

During the process 200, different embodiments of the in-vehicle information system use either or both of the processes 300 and 400 to deform the projection surface during the process 200. In one configuration, the process 300 typically generates deformations to the projection surface that more accurately reflect the shape of the object, but requires a larger number of computations and potentially more time to perform the optimization process for the deformation. The process 400 generates the deformations for the projection surface with fewer computations using the predetermined template polygon models, but the surfaces of the predetermined template polygon models are not necessarily as accurate as the deformations that are generated using the optimization process 300.

Referring again to FIG. 2, process 200 continues as the processor 108 projects the photographic image data onto the projection surface, including portions of the projection surface that are deformed to correspond to objects in the environment around the vehicle 102 (block 232). In the in-vehicle information system 104, one or more texture units in the GPU 116 project the photographic texture data 136 onto the polygons in the deformed projection surface. The shape of the deformed projection surface corresponds to the identified objects that are proximate to the vehicle 102. The stored photographic texture data 136 include the photographic representations of the objects, and the GPU 116 projects the photographs for the objects onto the corresponding deformed portions of the projection surface.

Process 200 continues with generation of a visual depiction of at least a portion of the projection surface including a 3D proxy model corresponding to the vehicle 102 on a display device in the vehicle 102 (block 236). In the in-vehicle information system 104, the processor 108 generates a two-dimensional depiction of a portion of the 3D virtual environment through the display device 132. In another embodiment, the display device 132 is a 3D display device including, but not limited to, a 3D display screen or a head-mounted 3D display device. In the in-vehicle information system 104, the GPU 116 retrieves the stored 3D vehicle proxy data 156 to generate a graphical depiction of the vehicle 102 in the virtual environment.

The display of the 3D proxy for the vehicle 102 in the virtual environment aids the occupants of the vehicle 102 in finding the distance between the vehicle 102 and the objects in the environment around the vehicle 102, and to identify the orientation of the vehicle 102 relative to the other objects in the environment around the vehicle 102. For example, in one mode of operation the operator of the vehicle 102 views the display that the process 200 generates to assist in parking the vehicle 102 in proximity to other vehicles and objects around a parking space. Process 200 enables the in-vehicle information system 104 to generate a visual depiction of the objects around the vehicle 102 with greater accuracy to aid the vehicle operator in parking the vehicle 102 in an appropriate manner.

Figure 11:
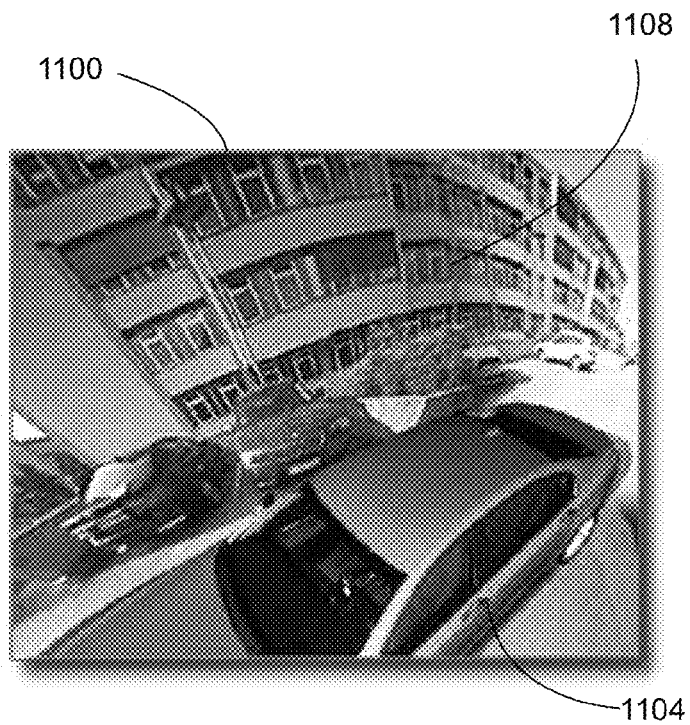
FIG. 11 is a prior art graphical display of an environment around a vehicle with a depiction of distorted objects around the vehicle.
Figure 12:
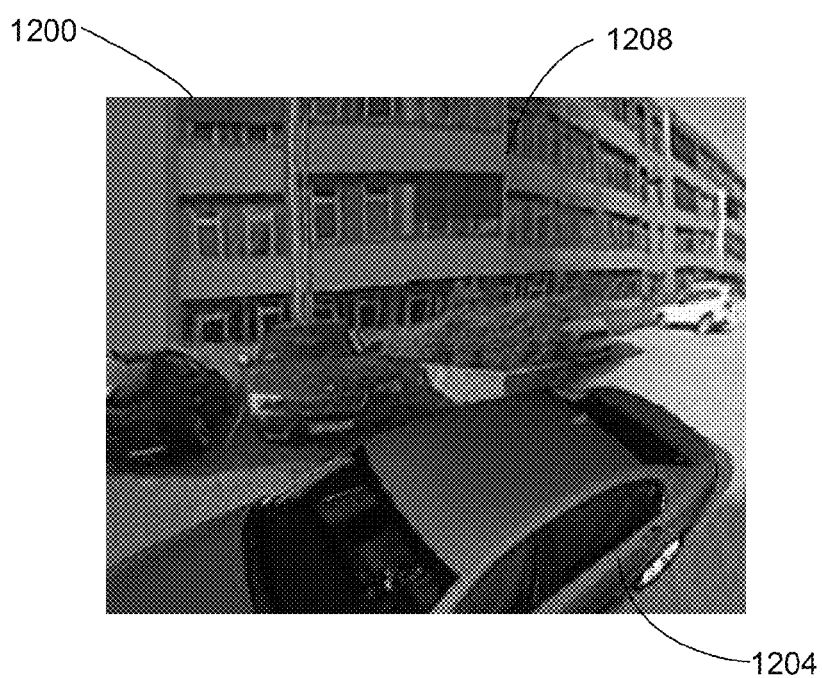
FIG. 12 is a graphical display of an environment around a vehicle that is generated using the process of FIG. 2 to reduce or eliminate the distortion of objects in the environment around the vehicle.

FIG. 11 and FIG. 12 depict graphical displays of the physical environment around a vehicle. FIG. 11 is a prior art view of an environment around a vehicle using an existing bowl-shaped projection surface that produces distortions of the objects in photographs of the environment around the vehicle. In FIG. 11, a display 1100 includes a 3D proxy model 1104 corresponding to the vehicle that generates the photographic data of the surrounding environment. The vehicle includes one or more cameras that produce a photographic view of the objects around the vehicle, but the display 1100 shows marked distortion of the objects. For example, the display 1100 includes a nearby building 1108 that is displayed with a pronounced curvature that is due to distortion in the displayed image and not the actual shape of the building. FIG. 12 is an example of a graphical display 1200 of a 3D vehicle proxy model 1204 in an environment that is generated using process 200. Since the process 200 deforms the projection surface to correspond to the shape of objects in the environment around the vehicle 102, the building 1208 is displayed with a more realistic shape in the display 1200. Other objects in the environment around the 3D vehicle proxy model 1204 are also depicted with greater accuracy, which enables the operator of the vehicle 102 to judge the relative locations of objects around the vehicle with greater accuracy.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A method for rendering graphics in a three-dimensional virtual environment corresponding to a physical environment surrounding a vehicle comprising:

generating with at least one camera in an in-vehicle information system data corresponding to a plurality of photographs of the physical environment surrounding the vehicle taken in a plurality of directions extending outward from the vehicle;

generating with at least one sensor in the in-vehicle information system sensor data corresponding to a shape, relative distance from the vehicle, and a direction from the vehicle of an object in the physical environment;

generating with a processor in the in-vehicle information system a default three-dimensional projection surface centered around a virtual representation of the vehicle in a virtual environment;

generating with the processor first polygon model data corresponding to the shape of the object in the sensor data;

deforming with the processor the three-dimensional projection surface with reference to the first polygon model data for the object at a location in the virtual environment corresponding to the relative distance and direction of the object in the sensor data;

projecting with the processor the plurality of photographs onto the deformed three-dimensional projection surface; and displaying with a display device in the in-vehicle information system graphics corresponding to the deformed three-dimensional projection surface with the plurality of projected photographs.

2. The method of claim 1 further comprising:
identifying with the processor geographic coordinates of the vehicle with data received from a positioning system in the in-vehicle information system; and retrieving with the processor second polygon model data corresponding to at least one terrain feature associated with the identified geographic coordinates from a memory in the in-vehicle information system; and deforming with the processor the projection surface with reference to the second polygon model data for the at least one terrain feature.

3. The method of claim 1, the generation of the sensor data further comprising:
emitting laser light from a laser ranging device in the vehicle; and
detecting reflection of the laser light from the object with an optical detector in the vehicle.

4. The method of claim 1, the generation of the sensor data further comprising:
emitting ultrasound signals from an ultrasonic emitter in the vehicle; and
detecting reflection of the ultrasound signals from the object with an ultrasound receiver in the vehicle.

5. The method of claim 1, the generation of the sensor data further comprising:
emitting a radar signal from a radar transmitter in the vehicle; and
detecting reflection of the radar signal from the object with a radar receiver in the vehicle.

6. The method of claim 1, the generation of sensor data further comprising:
generating with the at least one camera data corresponding to a plurality of photographs during motion of the vehicle; and
applying with the processor a structure from motion process on the data corresponding to the plurality of photographs to identify the relative distance, and relative direction of the object.

7. The method of claim 1 further comprising:
generating data corresponding to stereoscopic photographs with a stereoscopic camera in the vehicle; and identifying with the processor the relative distance and relative direction of the object with reference to the data corresponding to the stereoscopic photographs.

8. The method of claim 1, the deformation of the three-dimensional projection surface further comprising:
performing with the processor a minimum energy optimization process to transform the three-dimensional projection surface to conform to coordinates in the virtual environment of the sensor data.

9. The method of claim 1, the generation of the first polygon model data and deformation of the three-dimensional projection surface further comprising:
matching with the processor the sensor data corresponding to the object to a plurality of three-dimensional polygon model templates stored in a memory;
identifying with the processor one three-dimensional polygon model template in the plurality of three-dimensional model templates with a best match to the shape of the object; and
deforming with the processor the three-dimensional projection surface to correspond to the three-dimensional polygon model template.

10. A system for displaying three-dimensional graphics corresponding to a physical environment around a vehicle comprising:
a camera system configured to generate data corresponding to a plurality of photographs of the physical environment taken in a plurality of directions extending outward from the vehicle;
a sensor system configured to generate sensor data corresponding to a shape, relative distance from the vehicle, and direction from the vehicle of an object in the physical environment;
a display device; and
a processor operatively connected to the camera system, the sensor system, and the display device, the processor being configured to:
receive the data corresponding to the plurality of photographs generated by the camera system;
receive the sensor data corresponding to the shape, relative distance from the vehicle, and direction from the vehicle of the object;
generate a default three-dimensional projection surface centered around a virtual representation of the vehicle in a virtual environment;
generate first polygon model data corresponding to the shape of the object in the sensor data;
deform the three-dimensional projection surface with reference to the first polygon model data for the object at a location in the virtual environment corresponding to the relative distance and direction of the object in the sensor data;
project the plurality of photographs onto the deformed three-dimensional projection surface; and
display graphics corresponding to the deformed three-dimensional projection surface with the plurality of projected photographs with the display device.

11. The system of claim 10 further comprising:
a positioning system configured to generate data corresponding to a geographic location of the vehicle; and
the processor being operatively connected to the positioning system and further configured to:
identify geographic coordinates of the vehicle with data received from a positioning system; and
retrieve second polygon model data corresponding to at least one terrain feature associated with the identified geographic coordinates; and deform the projection surface with reference to the second polygon model data for the at least one terrain feature.

12. The system of claim 10, the sensor system further comprising:
a laser ranging device in the vehicle configured to emit laser light and detect reflection of the laser light from the object.

13. The system of claim 10, the sensor system further comprising:
an ultrasound ranging device in the vehicle configured to emit ultrasound signals and detect reflection of the ultrasound signals from the object.

14. The system of claim 10, the sensor system further comprising:
a radar device in the vehicle configured to emit radar signals and detect reflection of the radar signals from the object.

15. The system of claim 10, the camera system being further configured to:
generate data corresponding to a plurality of photographs during motion of the vehicle; and
the processor being further configured to:
apply a structure from motion process on the data corresponding to the plurality of photographs to identify the relative distance and relative direction of the object from the vehicle.

16. The system of claim 10, the camera system further comprising:
a stereoscopic camera configured to generate data corresponding to stereoscopic photographs; and
the processor being further configured to:
identify the relative distance and direction of the object with reference to the data corresponding to the stereoscopic photographs.

17. The system of claim 10, the processor being further configured to:
perform a minimum energy optimization process to transform the three-dimensional projection surface to conform to coordinates in the virtual environment that correspond to the sensor data.

18. The system of claim 10, the processor being further configured to:
match the sensor data corresponding to the object to a plurality of three-dimensional polygon model templates stored in a memory;
identify one three-dimensional model template in the plurality of three-dimensional polygon model templates with a best match to the shape of the object; and
deform the three-dimensional projection surface to correspond to the three-dimensional polygon model template.

* * * * *